US012785859B2

(12) United States Patent
Gao et al.

(10) Patent No.: US 12,785,859 B2
(45) Date of Patent: Nov. 3, 2026

(54) DATA TRANSMISSION METHOD, APPARATUS, AND SYSTEM

(71) Applicant: HUAWEI TECHNOLOGIES CO., LTD., Shenzhen (CN)

(72) Inventors: Lei Gao, Beijing (CN); Xingqing Cheng, Beijing (CN); Qingchun He, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 245 days.

(21) Appl. No.: 18/418,847

(22) Filed: Jan. 22, 2024

(65) Prior Publication Data

US 2024/0163023 A1 May 16, 2024

Related U.S. Application Data

(63) Continuation of application No. PCT/CN2022/085647, filed on Apr. 7, 2022.

(30) Foreign Application Priority Data

Jul. 23, 2021 (CN) ........................ 202110838300.7

(51) Int. Cl.
*H04L 1/1812* (2023.01)
*H04L 1/1829* (2023.01)

(52) U.S. Cl.
CPC .......... *H04L 1/1819* (2013.01); *H04L 1/1838* (2013.01); *H04L 1/1854* (2013.01)

(58) Field of Classification Search
CPC .... H04L 1/1819; H04L 1/1838; H04L 1/1854
See application file for complete search history.

(56) References Cited

U.S. PATENT DOCUMENTS 11,191,116 B2 11/2021 Cheong et al.
2011/0164664 A1* 7/2011 Torsner ................ H04L 1/1887 375/295

(Continued)

FOREIGN PATENT DOCUMENTS

CN 101990240 A 3/2011
CN 102143137 A 8/2011
WO 2010036154 A1 4/2010

OTHER PUBLICATIONS

Extended European Search Report in European Appln. No. 22844887.4, mailed on Oct. 10, 2024, 9 pages.

(Continued)

*Primary Examiner* — Mark D Featherstone
*Assistant Examiner* — Jeffrey Andrew Yang
(74) *Attorney, Agent, or Firm* — Fish & Richardson P.C.

(57) ABSTRACT

This application provides data transmission methods and devices. An example method includes: receiving, in a current transmission opportunity used for transmitting first data, control information and a first data packet of the first data from a first node, where the control information includes a sequence number (SN) of the first data packet, the control information fails to be received, in M continuous transmission opportunities that are used for receiving the first data and that are before the current transmission opportunity, from the first node, and M is an integer greater than 0; and in response to determining that M is greater than or equal to a first threshold, determining that the first data packet is a new data packet.

20 Claims, 8 Drawing Sheets

(56) References Cited

U.S. PATENT DOCUMENTS

| | | | | |
|---|---|---|---|---|
| 2018/0376490 | A1* | 12/2018 | Lunttila | H04L 1/1854 |
| 2020/0260322 | A1 | 8/2020 | Chen | |
| 2021/0092038 | A1* | 3/2021 | Burchard | H04L 43/16 |

OTHER PUBLICATIONS

Office Action in Indian Appln. No. 202417006426, mailed on May 19, 2026, 7 pages (with English translation).

* cited by examiner

DATA TRANSMISSION METHOD, APPARATUS, AND SYSTEM

CROSS-REFERENCE TO RELATED APPLICATIONS

This application is a continuation of International Application No. PCT/CN2022/085647, filed on Apr. 7, 2022, which claims priority to Chinese Patent Application No. 202110838300.7, filed on Jul. 23, 2021. The disclosures of the aforementioned applications are hereby incorporated by reference in their entireties.

TECHNICAL FIELD

Embodiments of this application relate to the field of communication technologies, and more specifically, to a data transmission method, apparatus, and system.

BACKGROUND

With the rapid development of wireless communication technologies, the wireless communication technologies are applied to increasingly wide fields, and are not merely used for conventional voice communication, but are further used to support communication between smart devices with rich and diversified functions, for example, communication between smart devices like a smartphone, a smart transportation device, a smart home device, and a robot.

With the popularization and diversity development of the smart devices, there is a requirement for short-range communication between the smart devices in a specific communication area or range. Therefore, short-range communication technologies develop rapidly, for example, wireless communication technologies such as wireless fidelity (wireless fidelity, Wi-Fi), Bluetooth (Bluetooth), and ZigBee.

However, current short-range communication is easily interfered with. This affects data transmission reliability, and leads to low transmission efficiency.

SUMMARY

Embodiments of this application disclose a data transmission method, apparatus, and system, to reduce an error that a new data packet is incorrectly determined as a retransmission data packet and is retransmitted and combined with a previously received old data packet, thereby improving data transmission reliability, and improving transmission efficiency.

According to a first aspect, a data transmission method is provided for communication between a first node and a second node, where the first node and the second node may be separately a master node and a slave node, that is, the first node may be the master node, and correspondingly, the second node is the slave node; or the first node is the slave node, and correspondingly, the second node is the master node; or the first node and the second node are two slave nodes that are directly connected. The method includes:

receiving, in a current transmission opportunity, control information and a first data packet from a first node, where the control information includes a sequence number SN of the first data packet, the control information fails to be received, in M continuous transmission opportunities before the current transmission opportunity, from the first node, M is an integer greater than 0, the M continuous transmission opportunities and the current transmission opportunity are used to receive first data from the first node, and the first data includes the first data packet; and if M is greater than or equal to a first threshold, determining that the first data packet is a new data packet.

In this embodiment of this application, the second node does not correctly receive the control information from the first node in a quantity of transmission opportunities exceeding the first threshold, and therefore determines a received data packet as the new data packet. In this manner, if the first node sends one or more new data packets in these transmission opportunities, the SN changes for a plurality of times, and a data packet sent in the current transmission opportunity is indicated as the retransmission data packet, the second node does not combine the received data packet with a cached previously received data packet. This reduces retransmission combination errors. In addition, even if the first node does not send the new data packets in these transmission opportunities and retransmission is still performed, the second node processes a received retransmission data packet as the new data packet, and delivers the received retransmission data packet to an upper protocol layer, and the received retransmission data packet may also be filtered by the upper protocol layer or a higher protocol layer by detecting a duplicate data packet. In this way, no error occurs, data transmission reliability is improved, and transmission efficiency is improved.

Optionally, the method further includes: if M is less than the first threshold, determining, based on the SN of the first data packet, whether the first data packet is the retransmission data packet or the new data packet.

The first threshold may be predefined by a system, or may be configured by a user, or may be configured by the master node.

The SN may indicate whether a currently transmitted data packet by the first node is the new data packet or the retransmission data packet. The SN may be one or more bits. To reduce signaling overheads, the SN may be one bit.

For example, whether the currently transmitted data packet is the new data packet may be determined based on whether a value of the SN changes. If the SN of the currently transmitted data packet is the same as an SN of a previously transmitted data packet, it indicates that the currently transmitted data packet is the retransmission data packet. If the SN of the currently transmitted data packet is different from the SN of the previously transmitted data packet, it indicates that the currently transmitted data packet is the new data packet.

In some possible implementations, retransmission combination is supported, to improve integrity and reliability of received data. If it is determined that the first data packet is the retransmission data packet, the first data packet is combined with a previously received data packet, or the first data packet is discarded. If it is determined that the first data packet is the new data packet, check is performed on the first data packet, and the first data packet that is successfully checked is delivered as the new data packet, or the first data packet that fails to be checked is buffered.

In some possible implementations, the method may further include: The second node sends control information to the first node, to indicate the first node to send the new data packet or the retransmission data packet.

The second node may send the control information to the first node, to indicate the first node to send the new data packet or the retransmission data packet.

If the second node fails to receive the control information, or the data packet fails the check, the second node may feed back to the first node by using the control information, to indicate the first node to retransmit the data packet.

If the second node successfully receives the control information, and the data packet passes the check, the second node may feed back to the first node by using the control information, to indicate the first node to send the new data packet.

The control information sent by the second node may include an NESN, and the NESN indicates the first node to send the new data packet or the retransmission data packet.

For example, the NESN may be set to an SN different from that of the received control information, so that the first node sends the new data packet. For another example, the NESN may be set to an SN the same as that of the received control information, so that the first node sends the retransmission data packet.

In still another possible implementation, the control information sent by the second node may include an acknowledgment ACK or a negative acknowledgment NACK, and the ACK or the NACK is used to feed back, to the first node, whether data transmission in the current transmission opportunity is successful, to indicate the first node to send the new data packet or the retransmission data packet in the next transmission opportunity.

According to a second aspect, a data transmission method is provided for communication between a first node and a second node, where the first node and the second node may be separately a master node and a slave node, that is, the first node may be the master node, and correspondingly, the second node is the slave node; or the first node is the slave node, and correspondingly, the second node is the master node; or the first node and the second node are two slave nodes that are directly connected. The method includes:

determining that a first data packet fails to be transmitted to a second node in N continuous transmission opportunities used for sending first data, where N is a minimum data packet transmission quantity of the first data and is an integer greater than 0; and sending a second data packet or stopping sending in a next transmission opportunity, where the first data includes the first data packet, or the first data includes the first data packet and the second data packet.

In the foregoing embodiment, after a plurality of times of transmitting a same data packet reaches the minimum data packet transmission quantity, the first node may determine to actively abandon transmission of the data packet, so that the new data packet can be sent in time, thereby ensuring data continuity and data real-time performance.

The minimum data packet transmission quantity of the first data may be predefined by a system, or may be configured by a user, or may be configured by the master node.

With reference to the first aspect, the second aspect, and related implementations, the first threshold may be determined based on the minimum data packet transmission quantity of the first data. For example, the first threshold is less than or equal to the minimum data packet transmission quantity of the first data, or the first threshold and the minimum data packet transmission quantity of the first data may be a same parameter. For another example, the first threshold is less than or equal to the minimum data packet transmission quantity of the first data×(2n−1), where n is a quantity of bits of the SN, and n is an integer greater than 0.

When the first threshold is less than or equal to the minimum data packet transmission quantity of the first data, the first node abandons a maximum of one retransmission data packet, and the SN changes at most once. After receiving correct control information in the current transmission opportunity, the second node may determine, based on the SN, whether to send the new data packet or the retransmission data packet.

In some possible implementations, the minimum data packet transmission quantity of the first data may also be determined for the first data by a master node of a communication domain in which the first node and the second node are located. For example, the minimum data packet transmission quantity of the first data is determined based on one or more of a service type, a delay requirement, and a cycle feature of the first data. The service type may include a video, a voice, a text, web browsing, and the like, and the delay requirement may include delay-sensitive and delay-insensitive. For another example, the minimum data packet transmission quantity of the first data may be determined with reference to a plurality of items of the service type, the delay requirement, and the cycle feature. Therefore, different types of data transmission with different requirements can be adapted.

In some possible implementations, when configuring a transmission resource, the master node may indicate the minimum data packet transmission quantity of the first data to the slave node by using configuration signaling.

For example, the first node is the master node, and the first node may send the configuration signaling to the second node; or the first node is the slave node, and the first node may receive the configuration signaling from the master node. It should be noted that if the master node is the second node, the first node receives configuration signaling from the second node; and if the master node is another node, the first node receives configuration signaling from the another node.

The configuration signaling includes resource information, the resource information includes information indicating one or more transmission opportunities for receiving the first data by the second node, and the configuration signaling further includes the minimum data packet transmission quantity of the first data.

According to a third aspect, a data transmission apparatus is provided, including a unit configured to perform the steps of the method in the first aspect and the implementations of the first aspect.

In a design, the data transmission apparatus is a communication chip, and the communication chip may include an input circuit or interface configured to send information or data, and an output circuit or interface configured to receive information or data.

In another design, the data transmission apparatus is a communication device (for example, a second device). The communication chip may include a transmitter configured to send information, and a receiver configured to receive information or data.

According to a fourth aspect, a data transmission apparatus is provided, including a unit configured to perform the steps of the method in the second aspect and the implementations of the second aspect.

In a design, the data transmission apparatus is a communication chip, and the communication chip may include an input circuit or interface configured to send information or data, and an output circuit or interface configured to receive information or data.

In another design, the data transmission apparatus is a communication device (for example, a first device). The communication chip may include a transmitter configured to send information, and a receiver configured to receive information or data.

According to a fifth aspect, a data transmission device is provided, including a processor and a memory. The memory is configured to store a computer program, and the processor is configured to invoke the computer program from the memory and run the computer program, to enable the communication device to perform the data transmission method in the first aspect or the second aspect and the implementations of the first aspect or the second aspect.

Optionally, there are one or more processors, and there are one or more memories.

Optionally, the memory may be integrated with the processor, or the memory is disposed independently of the processor.

Optionally, the communication device further includes a transmit machine (transmitter) and a receive machine (receiver).

According to a sixth aspect, a computer program product is provided. The computer program product includes: a computer program (also may be referred to as code or instructions). When the computer program is run, the computer is enabled to perform the data transmission method in the first aspect or the second aspect and the implementations of the first aspect or the second aspect.

According to a seventh aspect, a computer-readable medium is provided. The computer-readable medium stores a computer program (also may be referred to as code or instructions). When the computer program is run on a computer, the computer is enabled to perform the data transmission method in the first aspect or the second aspect and the implementations of the first aspect or the second aspect.

According to an eighth aspect, a data transmission system is provided. The system includes at least one apparatus according to any one of the third aspect and the apparatus according to any one of the fourth aspect.

According to a ninth aspect, a chip system is provided, including a memory and a processor. The memory is configured to store a computer program, and the processor is configured to invoke the computer program from the memory and run the computer program, so that a communication device installed with the chip system performs the data transmission method in the first aspect, the second aspect, and the implementations of the first aspect and the second aspect.

The chip system may include an input circuit or interface configured to send information or data, and an output circuit or interface configured to receive information or data.

BRIEF DESCRIPTION OF DRAWINGS

The following describes the accompanying drawings for embodiments of this application.

DESCRIPTION OF EMBODIMENTS

The following describes embodiments of this application with reference to the accompanying drawings.

Figure 1:
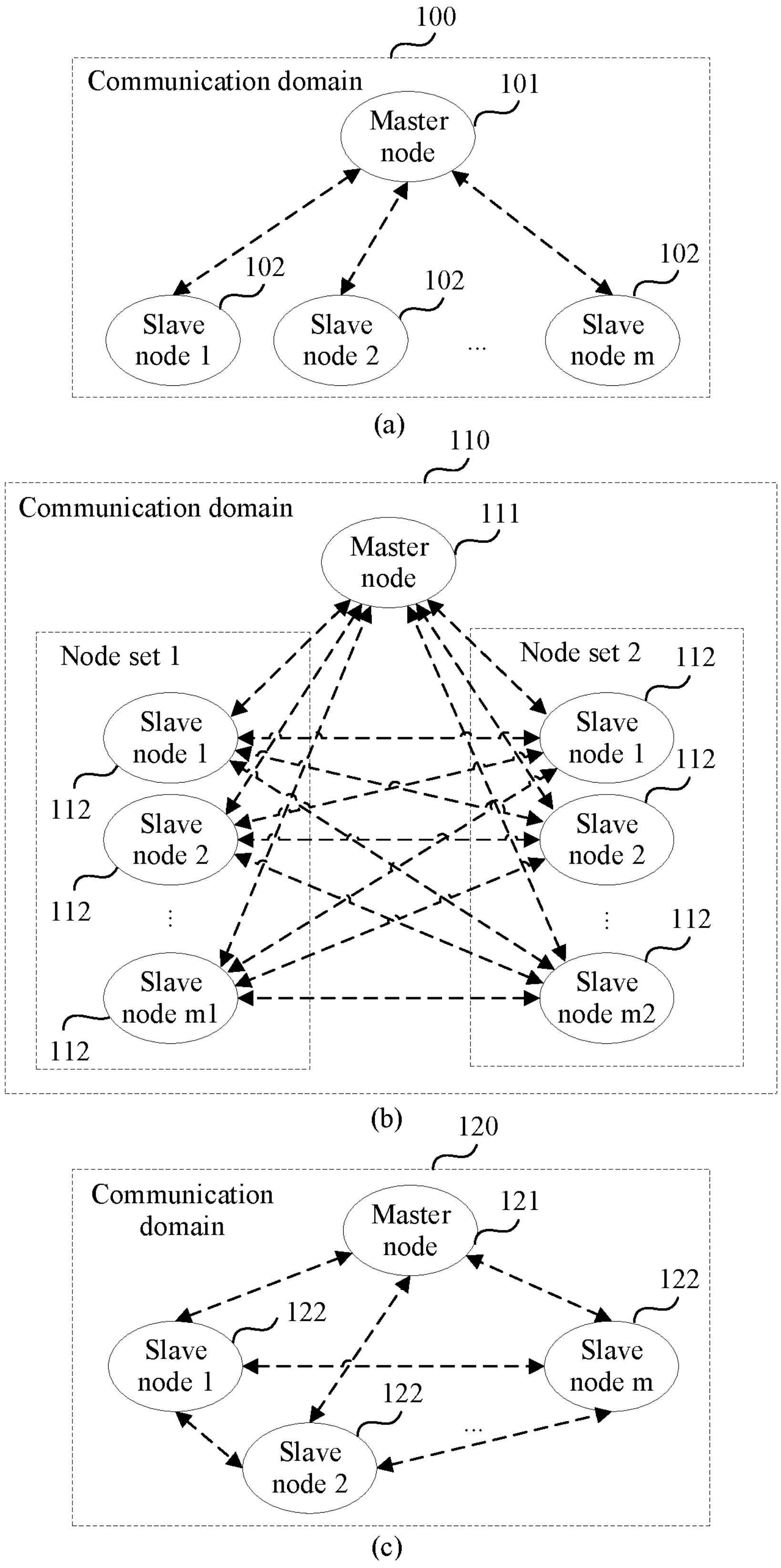
FIG. 1 to FIG. 3 are schematic diagrams of structures of a chip system according to an embodiment of this application.

Refer to FIG. 1. FIG. 1 is an example of schematic diagrams of three system architectures in a communication domain according to an embodiment of this application, as shown in (a), (b), and (c) in FIG. 1.

The communication domain includes a plurality of communication devices. There is a communication connection relationship (namely, a communication link) between the communication devices, and the communication devices may exchange information by using the communication link. In a communication scenario, the communication domain includes one primary communication device (which may be referred to as a primary device for short) and at least one secondary communication device (which may be referred to as a secondary device for short). The primary device manages a transmission resource (which may be referred to as a resource for short) of the communication domain, and has a function of scheduling a resource for the communication link between communication devices in the communication domain. The resource may be a time domain resource or a frequency domain resource, or includes a time domain resource and a frequency domain resource. The communication device may also be referred to as a communication node, or referred to as a node for short. In this case, the primary device may be referred to as a master node, and the secondary device may be referred to as a slave node.

(a) in FIG. 1 is a schematic diagram of a system architecture in a communication domain 100. The communication domain 100 includes one master node 101 and m slave nodes 102, where m is an integer greater than 0. Each slave node 102 may communicate with the master node 101, but the slave nodes 102 do not communicate with each other.

(b) in FIG. 1 is a schematic diagram of a system architecture in a communication domain 110. The communication domain 110 includes one master node 111 and a plurality of node sets (two node sets, namely, a node set 1 and a node set 2, are used as an example in (b) in FIG. 1). Each node set of the plurality of node sets includes one or more slave nodes 112. For example, the node set 1 includes m1 slave nodes 112, and the node set 2 includes m2 slave nodes. Both m1 and m2 are integers greater than 0. Each slave node 112 in the plurality of node sets may communicate with the master node 111. Slave nodes 112 in each node set may communicate with each other or may not communicate with each other, but each slave node 112 in each node set may communicate with slave nodes 112 in one or more other node sets. For example, the m1 slave nodes 112 in the node set 1 may communicate with each slave node 112 in the node set 2.

(c) in FIG. 1 is a schematic diagram of a system architecture in a communication domain 120. The communication domain 120 includes one master node 121 and m slave nodes 122, and any two of the master node 121 and the m slave nodes 122 may communicate with each other.

The system architectures shown in (a), (b), and (c) in FIG. 1 are merely examples, and do not constitute a limitation on this application.

In the system in the communication domain in embodiments of this application, nodes may perform wireless communication, for example, may communicate with each other by using a wireless communication technology like Wi-Fi, Bluetooth, or ZigBee.

Figure 2:
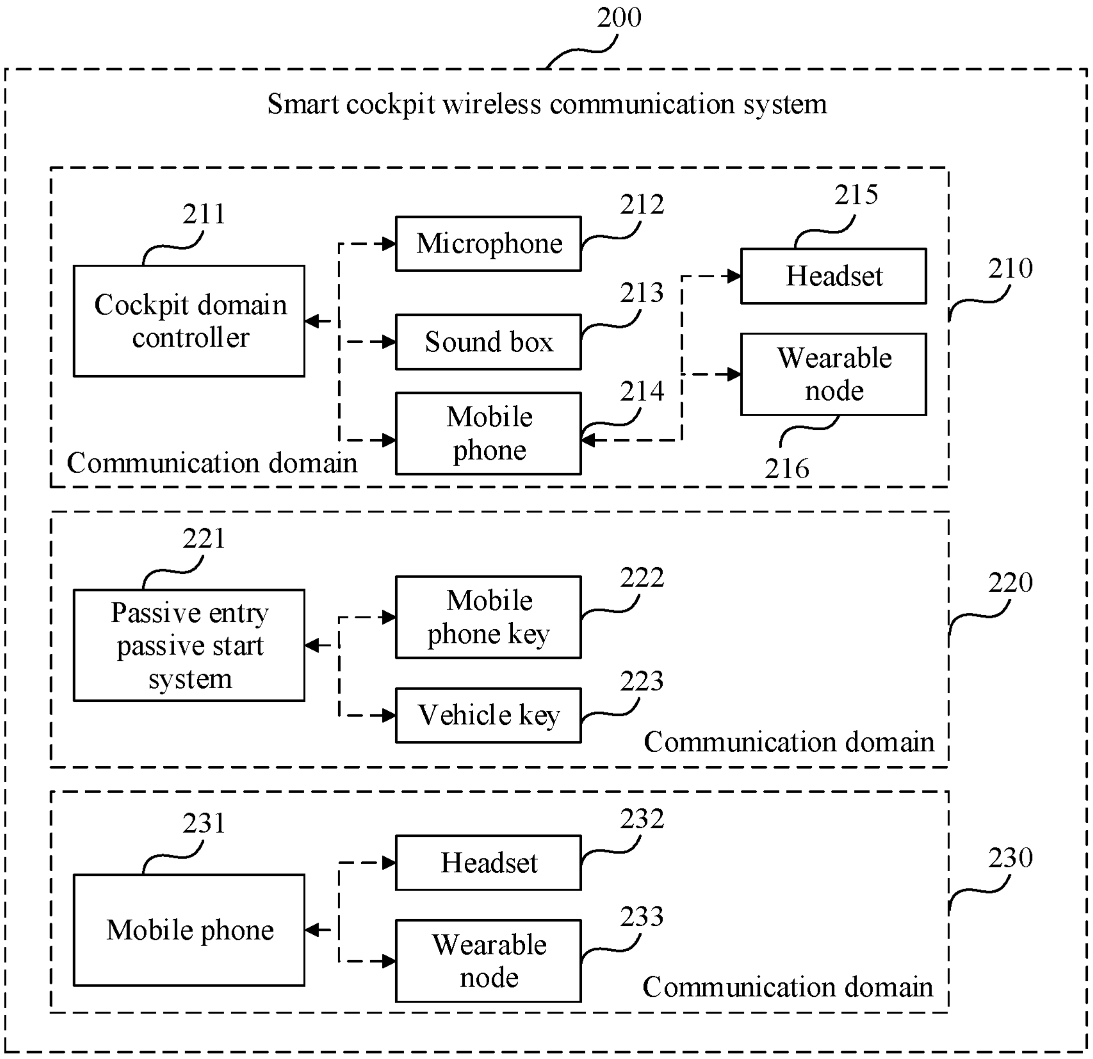

For ease of understanding, a communication domain in a smart cockpit wireless communication system is used as an example for description with reference to FIG. 2. FIG. 2 is a schematic diagram of an architecture of a smart cockpit wireless communication system 200. The smart cockpit wireless communication system 200 may include a communication domain 210, a communication domain 220, and a communication domain 230.

The communication domain 210 includes a master node: a cockpit domain controller (cockpit domain controller, CDC) 211, and includes slave nodes: a microphone 212, a sound box 213, and a mobile phone 214. The master node CDC 210 may perform wireless communication with the slave nodes: the microphone 212, the sound box 213, and the mobile phone 214. In addition, in the communication domain 210, the mobile phone 214, a headset 215, and a wearable node 216 may be located in one communication sub-domain. In the communication sub-domain, the mobile phone 214 is a master node, the headset 215 and the wearable node 216 are slave nodes, and the master node: the mobile phone 214 may perform wireless communication with the slave nodes: the headset 215 and the wearable node 216.

The communication domain 220 includes a master node system: a passive entry passive start (passive entry passive start, PEPS) system 221, and includes slave nodes: a mobile phone key 222 and a vehicle key 223. The master node: the PEPS 221 may perform wireless communication with the slave nodes: the mobile phone key 222 and the vehicle key 223.

The communication domain 230 includes a master node: a mobile phone 231, and includes slave nodes: a headset 232 and a wearable node 233. The master node: the mobile phone 231 may perform wireless communication with the slave nodes: the headset 232 and the wearable node 233.

Communication connection relationships between the primary and slave nodes in the communication domain 210, the communication domain 220, and the communication domain 230 may also be the connection relationships in the communication domains shown in (b) and (c) in FIG. 1. For details, refer to the foregoing descriptions. Details are not described herein again.

It may be understood that there may be different examples in different short-range wireless communication scenarios. For example, when the short-range wireless communication scenario is a home wireless communication scenario, the master node may be a home wireless gateway, and the slave node may be a home appliance or the like. For another example, when the short-range wireless communication scenario is an industrial short-range wireless communication scenario, the master node may be an industrial wireless gateway, and the slave node may be an automated guided vehicle (automated guided vehicle, AGV), a machine tool, a machine hand, or the like. The foregoing examples of the master node and the slave node are merely examples. This is not limited in this application.

Figure 3:
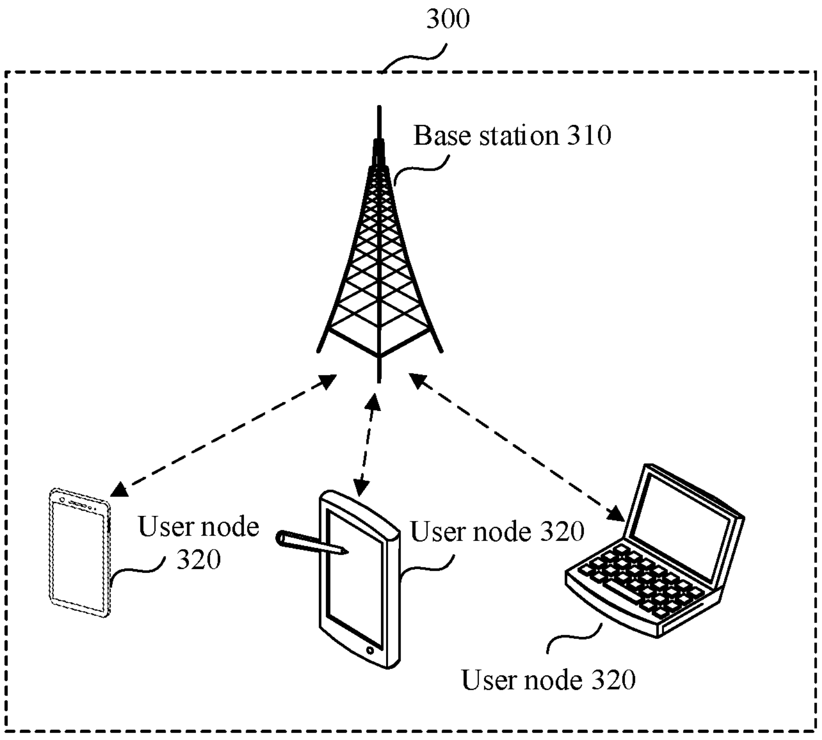

A communication domain in wide area wireless communication is further used as an example for description with reference to FIG. 3. FIG. 3 is a schematic diagram of an architecture of a communication domain 300 in wide area wireless communication. The communication domain 300 may include a base station 310 and a plurality of user equipments (user equipment, UE) 320. The UE 320 may be a node like a smartphone, a tablet computer, a personal computer, a handheld computer, a wearable electronic node, or a smart Internet of Things home appliance. In the communication domain 300, the base station 310 is a master node, the UE 320 is a slave node, and the slave node: the UE 320 may perform wireless communication with the master node: the base station 310.

In addition, in a communication domain in local area wireless communication, the base station 310 in FIG. 3 is replaced with an access point (access point, AP), so that a schematic system diagram of the communication domain in the local area wireless communication is obtained. The AP may be a wireless AP, for example, may be a wireless router, a wireless gateway, or a wireless bridge. Similarly, the AP may be a master node in a communication domain, the UE may also be referred to as a terminal (station, STA), and is a slave node. The UE may perform wireless communication with the AP.

Communication connection relationships between the primary and slave nodes in the communication domain in the wide area wireless communication and the communication domain in the local area wireless communication may also be the connection relationships in the communication domain shown in (b) and (c) in FIG. 1. For details, refer to the foregoing description. Details are not described herein again.

Certainly, the foregoing examples of the master node and the slave node are merely examples. This is not limited in this application. It should be noted that, when the wireless communication scenario shown in FIG. 1 is another wireless communication scenario, the master node and the slave node may alternatively be other possibilities, and are not listed one by one herein in this application. In addition, roles of the master node and the slave node may dynamically change. For example, the master node and the slave node are exchanged, or the master node becomes a slave node of another device, and the slave node becomes a master node of another device.

It should be noted that the quantities of master nodes and slave nodes shown in FIG. 1 are merely examples. In the wireless communication scenario, more or fewer nodes may further be included. This is not limited in this application. The master node may be referred to as a master node, a central node, or a grand node, and therefore may be referred to as an M node, a C node, or a G node for short. The slave node may be referred to as a slave node, a peripheral node, or a terminal, and therefore may be referred to as an S node, a P node, or a T node for short.

In the communication domain, the master node may communicate with one or more slave nodes. The master node in the communication domain may manage and configure a transmission resource of the communication domain, and has a function of scheduling a resource for a communication link between communication nodes in the communication domain. For example, the master node may send configuration signaling to the slave node in the communication domain. After receiving the configuration signaling from the master node, the slave node may transmit a message based on resource information in the configuration signaling. The message sent between the master node and the slave node may include control information or control information and a data packet TB. The configuration signaling may include one or more of the following resource information:

(1) Link type indication: For example, the link type indication may indicate that a link type is a direct link, a multicast link, an isochronous link, or an asynchronous link.

(2) Identifier indication of a link: An identifier of the link may uniquely identify a communication link in a communication domain.

(3) Transmission resource indication: For example, indications of a period and a length of a transmission opportunity, a start time point of at least one transmission opportunity, and the like may be included; for example, an indication of a frequency domain resource like a frequency used in a transmission opportunity may be further included; and for example, a transmission sequence and a quantity of transmissions of a node involved in communication in the transmission opportunity may further be included. For ease of understanding the period and the length of the transmission opportunity, for example, refer to Table 1. It is assumed that the period of the transmission opportunity is 100 milliseconds, and the length of the transmission opportunity is 20 milliseconds. In this case, every 100 milliseconds is a start time point of a transmission opportunity, and each transmission opportunity occupies 20 milliseconds for sending and receiving a message.

TABLE 1

| Transmission opportunity | Transmission opportunity 1 | Transmission opportunity 2 | . . . Transmission opportunity K |
|---|---|---|---|
| Start time point | $0^{th}$ millisecond | $100^{th}$ millisecond | . . . $((K - 1) \times 100)^{th}$ millisecond |
| End time point | $20^{th}$ millisecond | $120^{th}$ millisecond | . . . $((K - 1) \times 100 + 20)^{th}$ millisecond |

Figure 4:
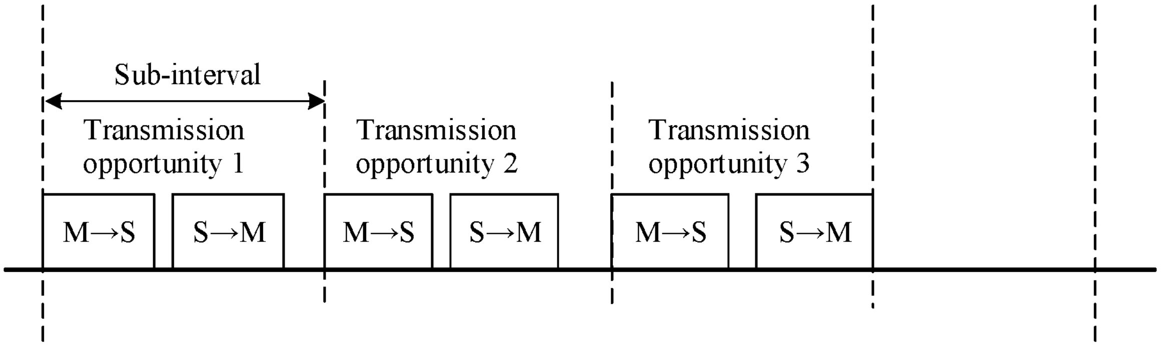
FIG. 4 is an example diagram of a transmission opportunity according to an embodiment of this application.

The transmission opportunity may be referred to as transmission for short, and is used to provide an opportunity for information transmission between communication nodes. The transmission opportunity may be referred to as a connection subevent, a connection event, a transmission event, a transmission subevent, a subevent, or the like. In each transmission opportunity, the master node and the slave node alternately serve as a sending node to send a message to a peer node. In other words, after sending a message to the slave node, the master node receives a message from the slave node (that is, the slave node sends a message to the master node) after receive/transmit transition time. As shown in FIG. 4, an example of alternating transmission between a master node M and a slave node S in three continuous transmission opportunities is provided, and transmission between a master node and a slave node in more transmission opportunities is deduced by analogy.

Figure 5:
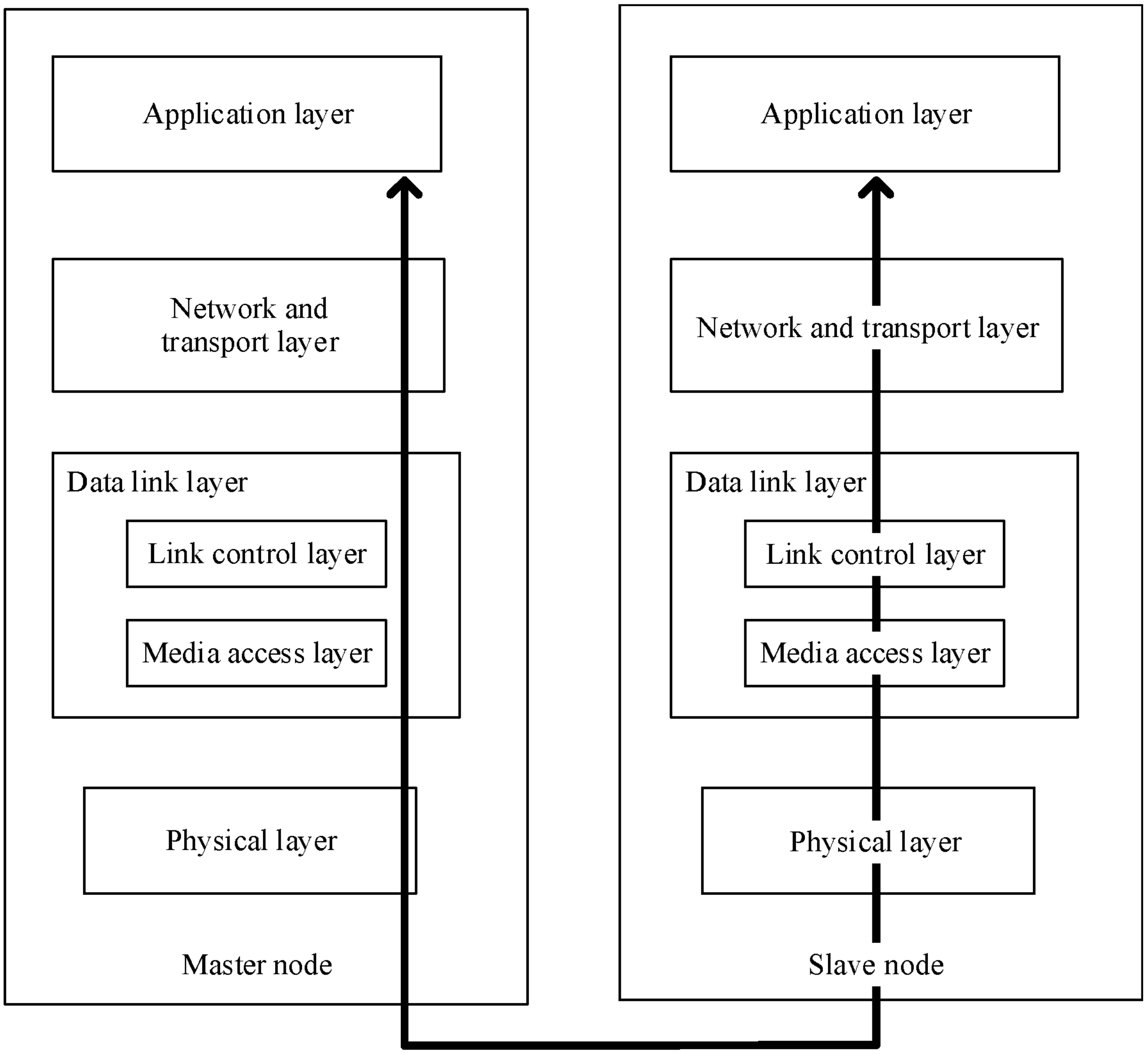
FIG. 5 is a schematic diagram of a wireless short-range transmission protocol layer according to an embodiment of this application.

Messages transmitted between the master and slave nodes may be sequentially processed by using a plurality of protocol layers in the nodes. FIG. 5 is an example of a protocol stack for communication between devices of the master and slave nods. Each node may include a physical layer, a data link layer, a network and transport layer, and an application layer from bottom to top. The physical layer uses a physical transmission medium to provide physical channels for the data link layer, and transmits and receives data on these physical channels to implement bit stream transmission. For example, the physical transmission medium is a frequency band resource in a specific frequency range, and the physical channel may be defined by using a frequency and a bandwidth. For example, a frequency band used in wireless short-range communication has a frequency range of 2.400 to 2.4835 gigahertz (GHz). To support a plurality of devices at the same time, the entire frequency band is divided into 40 parts, and a bandwidth of each part is 2 megahertz (MHz). Correspondingly, the physical channels may be 40 physical channels whose frequency points are $f=2402+k\times2$ MHz, $k=0, \ldots,$ or 39, and bandwidth is 2 MHz.

The data link layer shields information of the physical layer from an upper layer protocol, like the network and transport layer. The data link layer is used to implement connection and communication between the master node and the slave node, and may perform functions like resource management, access control, data segmentation, cascading, and working mode, to ensure reliable data transmission. In some implementations, the data link layer may be further divided into a media access layer and a link control layer.

The network and transport layer may perform processing like rearrangement on SDUs provided by the data link layer, and submit, based on a corresponding service flow, the SDUs to the application layer for processing. Alternatively, the network and transport layer performs processing like division and multiplexing on service data obtained from the application layer.

The application layer may distinguish the obtained different data into different data streams for processing by a lower layer protocol of the application layer.

Processing at a related protocol layer in a communication device may be implemented by a corresponding protocol layer module or protocol layer entity, and the protocol layer module or entity may be a software module or a hardware module. It should be noted that, the foregoing is merely an example, and protocol layer names or layers that may be included in a protocol stack in an actual communication device may be different. This is not limited thereto.

The methods shown in this application may be applied to the foregoing various wireless communication scenarios, and may be performed by the communication device in the wireless communication scenarios, or may be performed by a chip, a chip module (or a chip system), or the like that can be disposed in the communication device. For ease of description, in embodiments of this application, a communication device having a wireless transceiver function and a chip that can be disposed in the communication device are collectively referred to as a communication device. The communication device may also be referred to as a communication node, or referred to as a node for short. In this case, a primary device may be referred to as a master node, and a secondary device may be referred to as a slave node.

Figure 6:
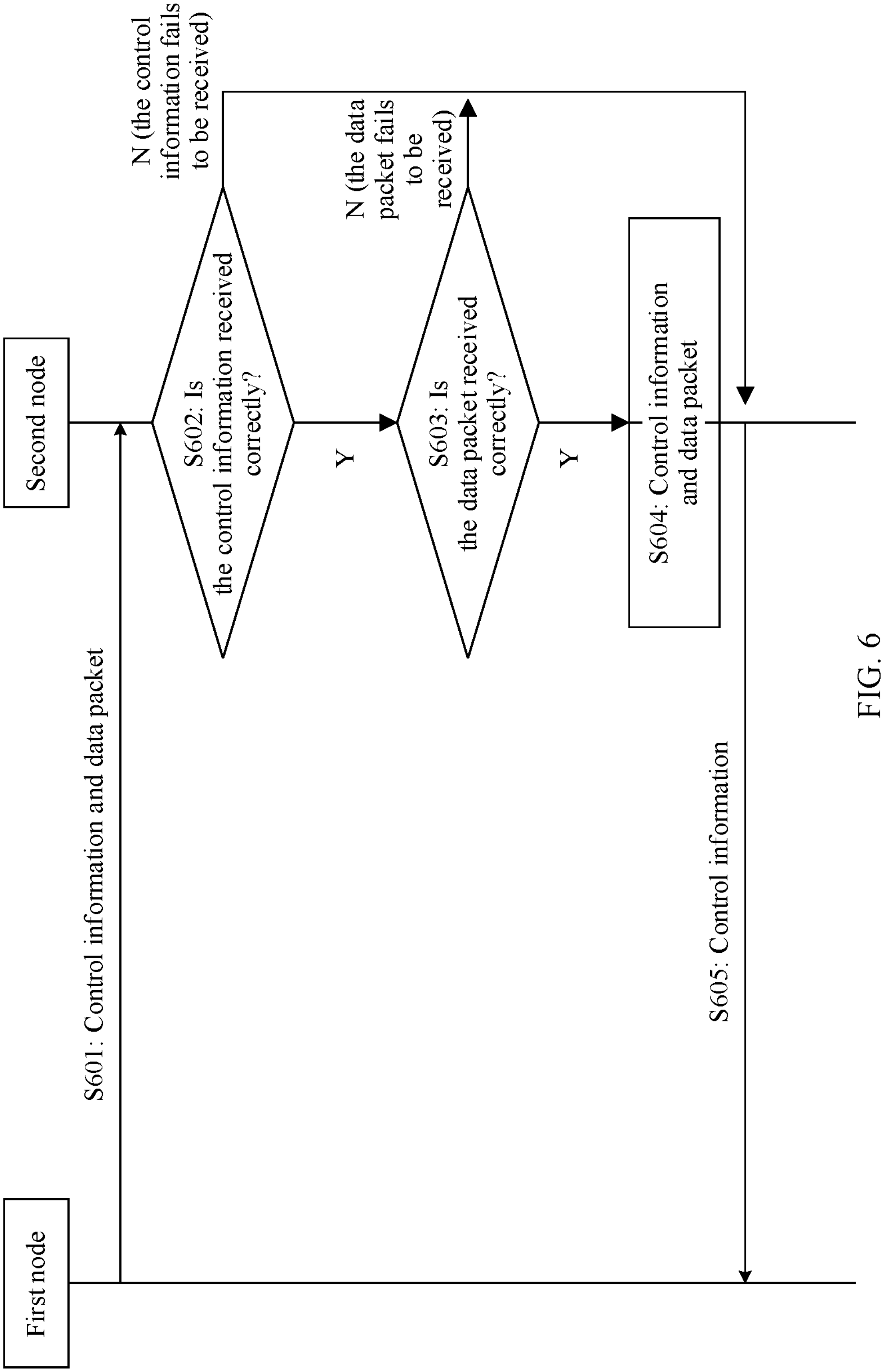
FIG. 6 is a schematic flowchart of a data transmission method according to an embodiment of this application.

After the master node configures the transmission resource for the slave node in the communication domain, data transmission may start between the master node and the slave node in the communication domain or between the slave nodes. Generally, two nodes transmit data by configuring a plurality of transmission opportunities for the transmitted data. In each transmission opportunity, the master node and the slave node alternately serve as the sending node to send the message to the peer node. In other words, after sending the message to the slave node, the master node receives the message from the slave node (that is, the slave node sends the message to the master node) after the receive/transmit transition time. FIG. 6 is a schematic diagram of a process of performing data transmission between two nodes in one transmission opportunity. A first node and a second node may be separately a master node and a slave node, that is, the first node may be the master node, and correspondingly, the second node is the slave node; or the first node is the slave node, and correspondingly, the second node is the master node; or the first node and the second node are two slave nodes that are directly connected.

S601: The first node sends, in a current transmission opportunity, a message to a second node, where the message includes control information and a data packet TB.

The first node sends, in each transmission opportunity based on a transmission resource allocated by the master node, the control information and the data packet TB to the second node, where the control information includes a sequence number (sequence number, SN) of a currently transmitted data packet TB.

The SN may indicate whether a currently transmitted data packet by the first node is a new data packet or a retransmission data packet. The SN may be one or more bits. In a possible implementation, whether the currently transmitted data packet is the new data packet may be determined based on whether a value of the SN changes. For example, if the SN of the currently transmitted data packet is the same as an SN of a previously transmitted data packet, it indicates that the currently transmitted data packet is the same as the previously transmitted data packet, and is the retransmission data packet; or if the SN of the currently transmitted data packet is different from an SN of a previously transmitted data packet, it indicates that the currently transmitted data packet is different from the previously transmitted data packet, and is the new data packet. For example, if the SN of the previously transmitted data packet is 0, and SN=0 is in the control information of the current transmission, it indicates that the currently transmitted data packet is the same as the previously transmitted data packet, and is the retransmission data packet; or if SN=1 is in the control information of the current transmission, it indicates that the currently transmitted data packet is different from the previously transmitted data packet, and is the new data packet.

The control information may further include a next expected sequence number (next expected sequence number, NESN). The NESN may indicate an SN of a data packet that the first node expects to receive from the second node after the second node receives the currently transmitted data packet. Similar to the SN, the NESN may indicate whether the first node expects the second node to send the new data packet or the retransmission data packet.

S602: The second node determines whether the control information is correctly received in the current transmission opportunity.

The second node receives the control information in a transmission opportunity for sending the control information and the data packet by the first node in S601. Because a wireless communication environment is complex and changeable and is vulnerable to interference, the second node may fail to receive the control information. For example, the second node does not detect the control information in the current transmission opportunity, or although a message is detected in the current transmission opportunity, a receiving power does not reach a preset threshold, or although the control information is received in the current transmission opportunity, cyclic redundancy check (cyclic redundancy check, CRC) check fails. The second node determines whether the control information is correctly received in the current transmission opportunity. If the receiving power of the control information reaches the preset threshold and the CRC check succeeds, it is determined that the control information is correctly received. If the control information is not detected, or the receiving power of the control information does not reach the preset threshold, or the CRC check fails, it is determined that the control information fails to be received. When it is determined that the control information fails to be received, if the second node is the master node, step S605 is performed to send the control information to the first node in a next transmission opportunity; or if the second node is the slave node, the second node does not send any message in the current transmission opportunity, ends receiving processing of the data packet in the current transmission opportunity, and waits for a next transmission opportunity.

After correctly receiving the control information, the second node may determine, based on the SN, whether the data packet is the retransmission data packet or the new data packet. For the new data packet, step S603 may be directly performed. For the retransmission data packet, if a previously received data packet is correctly transmitted and is submitted to an upper protocol entity for processing, it may be considered that the data packet is correctly received, and a currently received retransmission data packet is discarded, and step S605 is performed. If the second node does not support retransmission combination or the second node supports retransmission combination but currently does not buffer the previously received data packet, step S603 may be performed to check the retransmission data packet. If the second node supports retransmission combination, and the previously received data packet is currently cached, the second node may combine the received retransmission data packet with the cached previously received data packet, and perform step S603 to check the combined data packet.

S603: The second node further determines whether the data packet is correctly received.

If the second node determines that the control information is correctly received in the transmission opportunity, the second node performs the CRC check on the new data packet, the retransmission data packet, or the combined data packet in step S602. If the data packet passes the check, the second node may continue to perform steps S604 to S605. If the data packet fails the check, a data packet that fails to be checked may be discarded, and the second node performs step S605. Alternatively, when retransmission combination is supported, the second node caches the data packet that fails to be checked, to obtain a retransmission combination gain, and performs step S605.

S604: The second node processes a data packet that is successfully checked.

The protocol entity responsible for checking the data packet in the second node may deliver the data packet that is successfully checked to the upper layer protocol entity in the second node for processing. It should be noted that the protocol entity responsible for checking the data packet is relative to the upper layer protocol entity, and may be determined based on a protocol stack for communication between the first node and the second node. The protocol stack shown in FIG. 5 is used as an example. If the protocol entity responsible for checking the data packet is a physical layer entity, the upper layer protocol entity may be a data link layer entity or a media access layer entity; and if the protocol entity responsible for checking the data packet is a data link layer entity, the upper layer protocol entity may be a network and transport layer entity. The rest may be deduced by analogy.

S605: The second node sends the control information to the first node, to indicate the first node to send the new data packet or the retransmission data packet. Correspondingly, the first node receives the control information from the second node.

The second node may send the control information to the first node, to indicate the first node to send the new data packet or the retransmission data packet.

If the second node fails to receive the control information, or the data packet fails the check, the second node may feed back to the first node by using the control information, to indicate the first node to retransmit the data packet.

If the second node successfully receives the control information, and the data packet passes the check, the second node may feed back to the first node by using the control information, to indicate the first node to send the new data packet.

Because in each transmission opportunity, the master node sends before the slave node, if the second node is the slave node, the second node sends, in a same transmission opportunity, the control information to the first node. If the second node is the master node, the second node sends the control information in the next transmission opportunity.

The control information sent by the second node to the first node may be considered as a feedback to a message sent by the first node. The control information may include the NESN, and the NESN indicates the first node to send the new data packet or the retransmission data packet. For example, the NESN may be set to an SN different from that of the received control information, so that the first node sends the new data packet. For another example, the NESN may be set to an SN the same as that of the received control information, so that the first node sends the retransmission data packet.

In still another possible implementation, the control information may include an acknowledgment ACK or a negative acknowledgment NACK, and the second node feeds back, by using the ACK or the NACK to the first node, whether data transmission in the current transmission opportunity is successful. The first node may also determine, based on the ACK or the NACK, whether to send the new data packet or the retransmission data packet. For example, if the first node receives an ACK of the second node, the first node considers that transmission succeeds in the current transmission opportunity, and then the first node may send the new data packet in the next transmission opportunity. For another example, if the first node receives a NACK of the second node, the first node considers that transmission fails in the current transmission opportunity, and then the first node may retransmit the data packet in the next transmission opportunity.

The first node receives a message of the second node in the current transmission opportunity or the next transmission opportunity, and determines whether to retransmit the data packet or the new data packet.

In the foregoing process, if the first node correctly receives the control information of the second node, the first node may determine, based on the control information, whether to retransmit the data packet or the new data packet in the next transmission opportunity.

If the first node fails to receive the control information of the second node, the first node may retransmit the data packet in the next transmission opportunity for retransmission, and indicate, by using the SN, whether to retransmit the data packet.

If the first node cannot receive a control information feedback of the second node, or the first node can receive the control information of the second node, but the control information indicates to retransmit the data packet, the first node cannot transmit the new data packet based on the feedback of the second node, and data transmission may time out.

Figure 7:
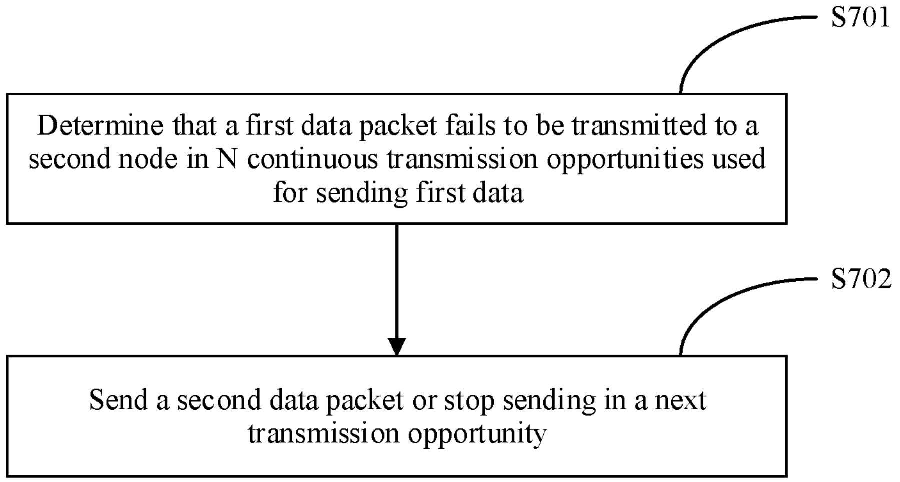
FIG. 7 is a schematic flowchart of a data transmission method according to an embodiment of this application.

To resolve the foregoing problem, in still another embodiment provided in this application, after a plurality of times of failing to transmit a same data packet and a quantity of the times of transmitting the data packet reaches a minimum data packet transmission quantity, the first node may determine to actively abandon transmission of the data packet. As shown in FIG. 7:

S701: A first node determines that a first data packet fails to be transmitted to a second node in N continuous transmission opportunities.

The N is a minimum data packet transmission quantity of first data, and is an integer greater than 0.

The first node sends the first data packet in a plurality of transmission opportunities for transmitting the first data to the second node. The first data transmitted by the first node to the second node may be divided into one or more transport blocks (transport block, TB). Each TB may be sent to the second node as one data packet in one transmission opportunity. The first data packet is one of the one or more data packets of the first data.

It may be understood that transmission opportunities used by the second node to receive the first data from the first node may be non-adjacent in time domain. However, if there is no other transmission opportunity used by the second node to receive the first data from the first node in two transmission opportunities, the two transmission opportunities may be understood as two continuous transmission opportunities used by the second node to receive the first data from the first node. A transmission opportunity shown in FIG. 4 is used as an example. If a transmission opportunity 1, a transmission opportunity 2, and a transmission opportunity 3 are all transmission opportunities used by the second node to receive the first data from the first node, the transmission opportunity 1, the transmission opportunity 2, and the transmission opportunity 3 should be considered as three continuous transmission opportunities. However, because the transmission opportunity 2 exists between the transmission opportunity 1 and the transmission opportunity 3, the transmission opportunity 1 and the transmission opportunity 3 are considered as discontinuous. If the transmission opportunity 1 and the transmission opportunity 3 are transmission opportunities used by the second node to receive the first data from the first node, and the transmission opportunity 2 is allocated to transmit other data, although the transmission opportunity 1 and the transmission opportunity 3 are discontinuous in time domain, there is no other transmission opportunity used by the second node to receive the first data from the first node between the transmission opportunity 1 and the transmission opportunity 3, the transmission opportunity 1 and the transmission opportunity 3 may be considered as two continuous transmission opportunities used by the second node to receive the first data from the first node.

In step S701, the N continuous transmission opportunities are all transmission opportunities used by the second node to receive the first data from the first node, or may be referred to as transmission opportunities used by the first node to send the first data to the second node.

It can be learned from the foregoing transmission process that, after the first node sends the data packet to the second node, if the data packet is successfully transmitted, the first node receives, in a current transmission opportunity or a next transmission opportunity, control information fed back by the second node, where the control information performs an acknowledgment or indicates to send a new data packet; or if the data packet fails to be transmitted, the first node may not receive the control information of the second node, or although the first node receives the control information of the second node, the control information indicates an negative acknowledgment or indicates to send a retransmission data packet.

The minimum data packet transmission quantity of the first data is an upper limit of a quantity of transmissions of sending the data packet determined by the first node when the first node fails to transmit the data packet of the first data to the second node. If the first node fails to transmit the first data packet to the second node in N continuous transmission opportunities, or a quantity of times of failing to transmit the first data packet by the first node to the second node reaches the minimum data packet transmission quantity of the first data, the second node may abandon transmission of the first data packet, as shown in step S702. If a quantity of times of transmitting the first data packet to the second node by the first node does not reach the minimum data packet transmission quantity of the first data because the first node fails to transmit the first data packet, and an acknowledgment of the second node or control information indicating transmission of the new data packet is received in a transmission opportunity, the first node does not need to retransmit the data packet, and may transmit the new data packet.

For example, the first node is a master node, and transmission opportunities used for transmitting the first data are a plurality of adjacent transmission opportunities. The first node sends the control information and the first data packet to the second node in a transmission opportunity p, where the transmission opportunity p to a transmission opportunity p+N−1 are N continuous transmission opportunities used for transmitting the first data, and p is an integer greater than 0. In the transmission opportunity p to the transmission opportunity p+N−1, the first node either does not receive control information fed back by the second node, or receives control information fed back by the second node, but the control information fed back indicates the first node to retransmit the first data packet or indicates a negative acknowledgment. In this case, the first node sends the first data packet to the second node in the N transmission opportunities. In other words, a quantity of sending the first data packet by the first node to the second node reaches the minimum data packet transmission quantity N.

For another example, the first node is a slave node, and the transmission opportunities used for transmitting the first data are a plurality of transmission opportunities at an interval of one transmission opportunity. The first node sends the control information and the first data packet to the second node in a transmission opportunity p, where the transmission opportunity p, a transmission opportunity p+2, . . . , and a transmission opportunity p+2(N−1) are N continuous transmission opportunities used for transmitting the first data, and p is an integer greater than 0. In the transmission opportunity p+2 to a transmission opportunity p+2N, the first node either does not receive the control information fed back by the second node, or receives the control information fed back by the second node, but the control information fed back indicates the first node to retransmit the first data packet or indicates a negative acknowledgment. In this case, the first node sends the first data packet to the second node in the N continuous transmission opportunities. In other words, a quantity of sending the first data packet by the first node to the second node reaches the minimum data packet transmission quantity N.

The first node may determine, each time the first data packet is transmitted or only when the first data packet needs to be retransmitted, a quantity of times of sending the first data packet. In other words, whether a quantity of transmission opportunities for sending the first data packet reaches the minimum data packet transmission quantity N of the first data. If the quantity of times of sending the first data packet does not reach the minimum data packet transmission quantity N of the first data, the first data packet may be sent in the transmission opportunity. If the quantity of times of sending the first data packet reaches the minimum data packet transmission quantity N of the first data, processing is performed according to step S702.

The minimum data packet transmission quantity of the first data may be predefined by a system, and may be configured by the master node.

The minimum data packet transmission quantity of the first data may also be determined for the first data by a master node of a communication domain in which the first node and the second node are located.

In a possible implementation, the minimum data packet transmission quantity of the first data is determined based on one or more of a service type, a delay requirement, and a cycle feature of the first data. The service type may include a video, a voice, a text, web browsing, and the like. For example, a service type of the first data is the video. This requires low reliability and high real-time performance, and the minimum data packet transmission quantity of the first data may be set to a small value, for example, one. For another example, the service type of the first data is the text. This requires high reliability, and the minimum data packet transmission quantity of the first data may be set to a large value, for example, five. The delay requirement may include delay-sensitive and delay-insensitive. For example, a small value may be set for the minimum data packet transmission quantity of delay-sensitive data, and a large value may be set for the minimum data packet transmission quantity of delay-insensitive data. For another example, the minimum data packet transmission quantity of the first data may be determined with reference to a plurality of items of the service type, the delay requirement, and the cycle feature.

S702: Send a second data packet or stop sending in a next transmission opportunity, where the first data includes the first data packet, or the first data includes the first data packet and the second data packet.

When the quantity of times of sending the first data packet reaches the minimum data packet transmission quantity N of the first data, the first node may actively abandon transmission of the first data packet. If the second data packet needs to be sent after the first data packet, the first node may start to transmit the second data packet. If no other data packet of the first data needs to be sent after the first data packet, the first node stops sending, or ends data transmission. Because the first node may actively abandon, based on the minimum data packet transmission quantity of data transmission, transmission of a data packet with poor quality, a data transmission delay can be reduced, and transmission efficiency can be improved.

Optionally, when configuring a transmission resource, the master node may indicate the minimum data packet transmission quantity of the first data to the slave node by using configuration signaling.

For example, the first node is the master node, and the first node may send the configuration signaling to the second node; or the first node is the slave node, and the first node may receive the configuration signaling from the master node. It should be noted that if the master node is the second node, the first node receives configuration signaling from the second node; and if the master node is another node, the first node receives configuration signaling from the another node.

The configuration signaling includes resource information, the resource information includes information indicating one or more transmission opportunities for receiving the first data by the second node, and the configuration signaling further includes the minimum data packet transmission quantity of the first data. The configuration signaling may further include other resource information. Refer to the foregoing description of the configuration signaling.

In the foregoing method, after a plurality of times of failing to transmit a same data packet and a quantity of the times of transmitting the data packet reaches the minimum data packet transmission quantity, the first node may determine to actively abandon transmission of the data packet, so that the new data packet can be sent in time, thereby ensuring data continuity and data real-time performance.

Figure 8:
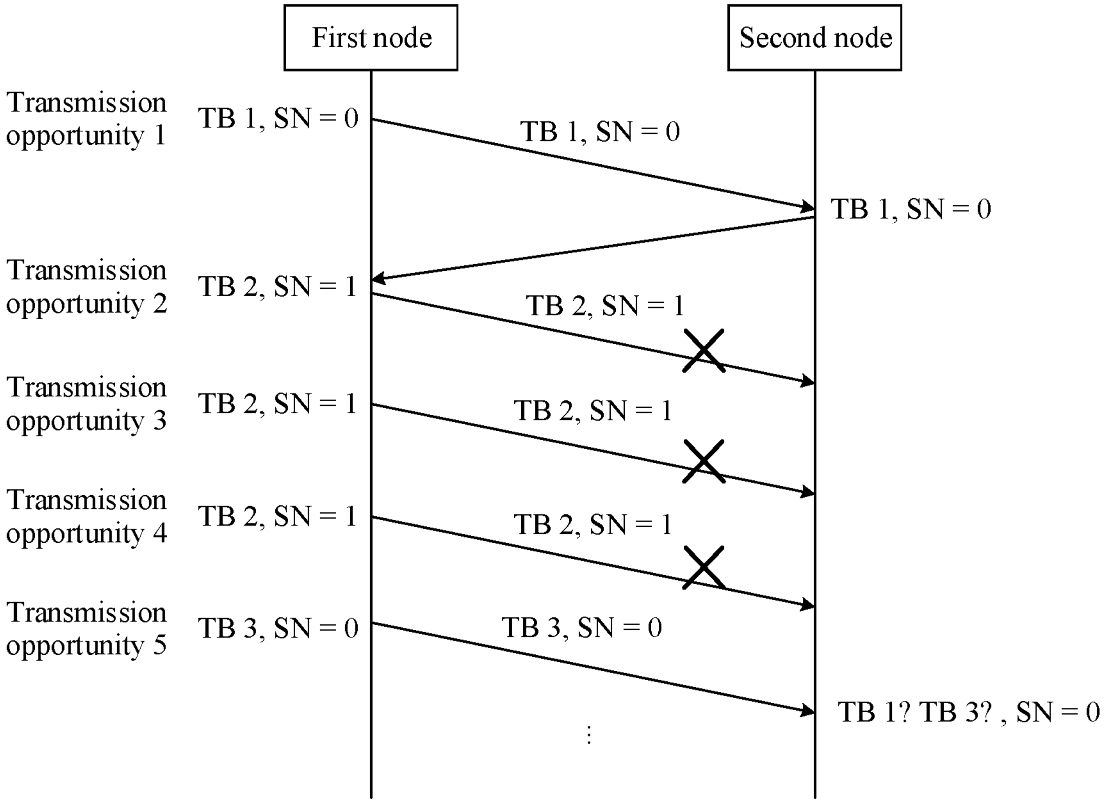
FIG. 8 is a schematic diagram of a data transmission process according to an embodiment of this application.

In the method shown in the foregoing embodiment, because the first node may actively abandon retransmission of one or more data packets, the SN changes for a plurality of times, and after the second node correctly receives the control information again, an obtained SN may cause the second node to incorrectly determine that the received data packet is the retransmission data packet. As shown in FIG. 8, a first node sends a TB 1 in a transmission opportunity 1, where SN=0, and a second node correctly receives control information. If a data packet fails check, the second node caches the TB 1 that fails the check, and sends control information to the first node to indicate the first node to retransmit the TB 1, where NESN=0. The first node abandons transmission of the TB 1, and sends a TB 2 in a transmission opportunity 2, where SN=1, and the second node does not correctly receive the control information and the data packet TB 2. The first node retransmits the TB 2 in the transmission opportunity 3 and the transmission opportunity 4, where SN=1 indicates retransmission, and the second node still does not correctly receive the control information and the data packet TB 2. The first node transmits a new data packet TB 3 in a transmission opportunity 5, where SN=0, and the second node correctly receives the control information. Because SN=0, the second node may incorrectly determine that the data packet received in the transmission opportunity 5 is a retransmission data packet TB 1, and incorrectly combine the TB 3 and the buffered TB 1, thereby causing a data receiving error.

Figure 9:
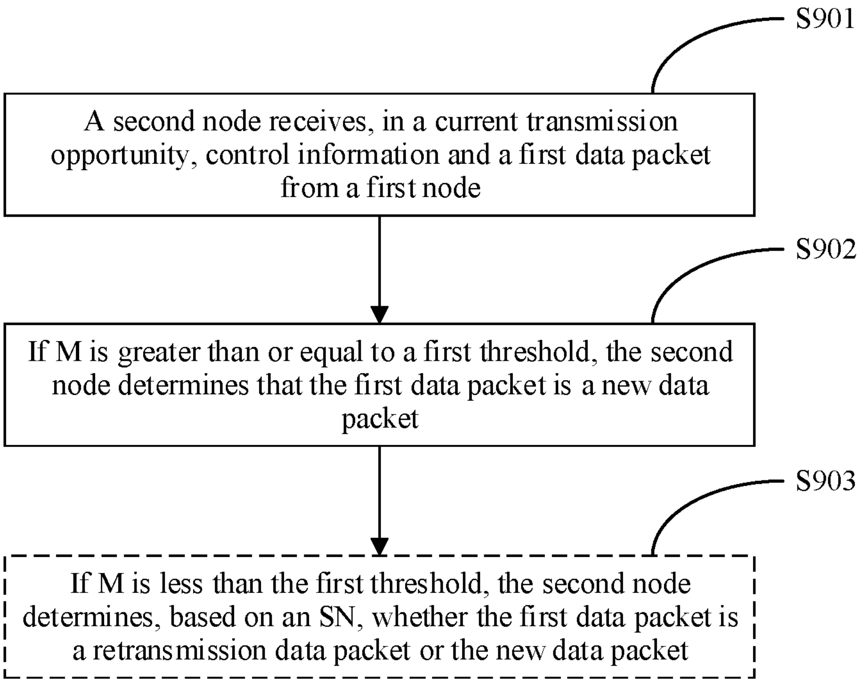
FIG. 9 is a schematic flowchart of a data transmission method according to an embodiment of this application.

To resolve this problem, based on the transmission process between nodes shown in FIG. 6, another embodiment of this application provides a data transmission method. As shown in FIG. 9, the method includes the following steps.

S901: A second node receives, in a current transmission opportunity, control information and a first data packet from a first node.

Refer to steps S601 and S602. The second node receives, in each transmission opportunity, the control information and the data packet of the first data from the first node and determines whether the received control information is correct. In the M continuous transmission opportunities before the current transmission opportunity, the second node fails to receive the control information from the first node. Both the current transmission opportunity and the M continuous transmission opportunities before the current transmission opportunity are transmission opportunities used by the second node to receive the first data from the first node.

For example, if the second node correctly receives the control information in a transmission opportunity k, fails to receive the control information in a transmission opportunity k+1 to a transmission opportunity k+M, and the current transmission opportunity is a transmission opportunity k+M+1, the second node fails to receive the control information in the M continuous transmission opportunities before the current transmission opportunity. Both k and M are integers greater than 0.

It may be understood that transmission opportunities used by the second node to receive the first data from the first node may be non-adjacent in time domain. However, if there is no other transmission opportunity used by the second node to receive the first data from the first node in two transmission opportunities, the two transmission opportunities may be understood as two continuous transmission opportunities used by the second node to receive the first data from the first node. A transmission opportunity shown in FIG. 4 is used as an example. If a transmission opportunity 1, a transmission opportunity 2, and a transmission opportunity 3 are all transmission opportunities used by the second node to receive the first data from the first node, the transmission opportunity 1, the transmission opportunity 2, and the transmission opportunity 3 should be considered as three continuous transmission opportunities. However, because the transmission opportunity 2 exists between the transmission opportunity 1 and the transmission opportunity 3, the transmission opportunity 1 and the transmission opportunity 3 are considered as discontinuous. If the transmission opportunity 1 and the transmission opportunity 3 are transmission opportunities used by the second node to receive the first data from the first node, and the transmission opportunity 2 is allocated to transmit other data, although the transmission opportunity 1 and the transmission opportunity 3 are discontinuous in time domain, there is no other transmission opportunity used by the second node to receive the first data from the first node between the transmission opportunity 1 and the transmission opportunity 3, the transmission opportunity 1 and the transmission opportunity 3 may be considered as two continuous transmission opportunities used by the second node to receive the first data from the first node.

The second node receives, in the current transmission opportunity, the control information and the first data packet from the first node, and determines that the received control information is correct.

S902: If M is greater than or equal to a first threshold, the second node determines that the first data packet is a new data packet.

If the second node determines that M is greater than or equal to the first threshold, that is, the second node does not correctly receive the control information in the M continuous transmission opportunities before the current transmission opportunity, the second node may determine that the received first data packet is the new data packet. The first threshold is an integer greater than 0, and may be used to determine a maximum interval at which data packets of the first data can be combined during retransmission.

Because the second node does not correctly receive the control information from the first node in a quantity of transmission opportunities exceeding the first threshold, the second node determines a data packet received in the quantity of transmission opportunities exceeding first threshold as the new data packet. In this manner, if the first node sends one or more new data packets in these transmission opportunities, the SN changes for a plurality of times, and a data packet sent in the current transmission opportunity is indicated as the retransmission data packet, the second node does not combine the received data packet with a cached previously received data packet. This reduces retransmission combination errors. In addition, even if the first node does not send the new data packets in these transmission opportunities and retransmission is still performed, the second node processes a received retransmission data packet as the new data packet, and delivers the received retransmission data packet to an upper protocol layer, and the received retransmission data packet may also be filtered by the upper protocol layer or a higher protocol layer by detecting a duplicate data packet. In this way, no error occurs, data transmission reliability is improved, and transmission efficiency is improved.

The first threshold may be predefined by a system, or may be configured by a master node, or may be configured by a user.

Optionally, the first node may actively abandon transmission of the data packet according to the method shown in steps S701 to S702. The first threshold may be determined based on a minimum data packet transmission quantity of the first data. For example, the first threshold is less than or equal to the minimum data packet transmission quantity of the first data, or the first threshold and the minimum data packet transmission quantity of the first data may be a same parameter. For another example, the first threshold is less than or equal to the minimum data packet transmission quantity of the first data×(2n−1), where n is a quantity of bits of the SN, and n is an integer greater than 0.

This is because when the first threshold is less than or equal to a minimum data packet transmission quantity of transmission data, the first node abandons a maximum of one retransmission data packet, and the SN changes at most once. After receiving correct control information in the current transmission opportunity, the second node may determine, based on the SN, whether to send the new data packet or the retransmission data packet. FIG. 8 is used as an example. The minimum data packet transmission quantity is 3, and the first node stops sending the TB 2 after sending the TB 2 for three times. If the first threshold is less than or equal to the minimum data packet transmission quantity, for example, 2, when the second node receives the TB 3 in the transmission opportunity 5 and SN=0, even if the SN is unchanged compared with that of the transmission opportunity 1, the second node determines the received TB 3 as the new data packet for processing. On the contrary, if the first threshold is greater than the minimum data packet transmission quantity, for example, the first threshold is 4, because the second node fails to receive the control information in three continuous transmission opportunities when the second node receives the TB 3 in the transmission opportunity 5 and SN=0, the second node incorrectly determines, based on the SN, that the TB 3 is a retransmission data packet of the TB 1. This causes a processing error, for example, combining the TB 3 and the cached TB 1.

Further, the second node may further discard a cached previously received data packet, to save cache space.

Optionally, the following step may further be included:

S903: If M is less than the first threshold, the second node determines, based on the control information, whether the first data packet is the retransmission data packet or the new data packet.

If M is less than the first threshold, the second node determines, based on the SN in the control information, whether the first data packet is the retransmission data packet or the new data packet. Refer to S601.

After the data packet received in the current transmission opportunity is determined as the new data packet or the retransmission data packet in steps S902 and S903, for processing of the data packet, refer to steps S603 to S605.

Optionally, when configuring the transmission resource, the master node may indicate at least one of two parameters of the first threshold and the minimum data packet transmission quantity of the first data to a slave node by using configuration signaling.

For example, the first node is the master node, and the first node may send the configuration signaling to the second node; or the first node is the slave node, and the first node may receive the configuration signaling from the master node. It should be noted that if the master node is the second node, the first node receives configuration signaling from the second node; and if the master node is another node, the first node receives configuration signaling from the another node.

The configuration signaling includes resource information, the resource information includes information indicating one or more transmission opportunities for receiving the first data by the second node, and the configuration signaling further includes at least one of the following: the minimum data packet transmission quantity of the first data or the first threshold. The configuration signaling may further include other resource information. Refer to the foregoing description of the configuration signaling. According to the method in embodiments of this application, combination errors caused by incorrect determining caused by a plurality of SN changes during retransmission combination of data packets can be reduced, thereby improving data transmission reliability and transmission efficiency. In addition, when the first node supports actively abandoning transmission of the data packet, the first threshold may be determined based on the minimum data packet transmission quantity of the data transmission, to adapt to data transmission of different types and different requirements.

It should be understood that embodiments described in this specification may be independent solutions, or may be combined based on internal logic. These solutions all fall within the protection scope of embodiments of this application.

The foregoing describes, in detail with reference to FIG. 6 to FIG. 9, the data transmission methods provided in embodiments of this application. The following describes, in detail with reference to FIG. 10 to FIG. 11, the data transmission apparatus in embodiments of this application. It should be understood that descriptions of the apparatus embodiments correspond to descriptions of the method embodiments, and corresponding technical effects correspond to those in the method embodiments. Therefore, for content that is not described in detail, refer to the foregoing method embodiments. For brevity, details are not described herein again.

Figure 10:
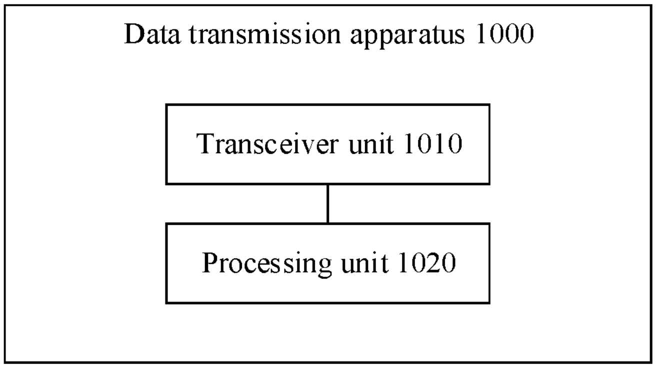
FIG. 10 is a schematic block diagram of a data transmission apparatus according to an embodiment of this application.

FIG. 10 is a schematic block diagram of a data transmission apparatus according to an embodiment of this application. An apparatus 1000 includes a transceiver unit 1010 and a processing unit 1020. The transceiver unit 1010 may implement a corresponding communication function, and the processing unit 1020 is configured to perform data processing. The transceiver unit 1010 may also be referred to as a communication interface or a communication unit.

Optionally, the apparatus 1000 may further include a storage unit. The storage unit may be configured to store instructions and/or data. The processing unit 1020 may read the instructions and/or the data in the storage unit, to enable the apparatus to implement the foregoing method embodiments.

The apparatus 1000 may be configured to perform an action performed by the first node or the second node in the foregoing method embodiments. Specifically, the transceiver unit 1010 is configured to perform a receiving and sending related operation on a side of the first node or the second node in the foregoing method embodiments, and the processing unit 1020 is configured to perform a processing related operation on the side of the first node or the second node in the foregoing method embodiments.

The apparatus 1000 may implement steps or procedures performed on the side of the first node or the second node in the method embodiments according to embodiments of this application. The apparatus 1000 may include units configured to perform the methods performed on the side of the first node or the second node in FIG. 6, FIG. 7, and FIG. 9. In addition, the units in the apparatus 1000 and the foregoing other operations and/or functions are separately used to implement corresponding procedures in the method embodiments on the side of the first node or the second node in FIG. 6, FIG. 7, and FIG. 9.

When the apparatus 1000 is configured to perform the method performed by the first node in FIG. 6, the transceiver unit 1010 may be configured to perform step S601 of sending control information to the first node and step S605 of receiving control information of the second node; and the processing unit 1020 may be configured to perform step S605.

When the apparatus 1000 is configured to perform the method performed by the second node in FIG. 6, the transceiver unit 1010 may be configured to perform step S601 of receiving control information sent by the first node and step S605 of sending control information to the first node; and the processing unit 1020 may be configured to perform steps S602 to S604.

When the apparatus 1000 is configured to perform the method performed by the first node in FIG. 7, the transceiver unit 1010 may be configured to perform step S702 of sending a data packet to the second node, and the processing unit 1020 may be configured to perform step S701.

The processing unit 1020 may be configured to determine that a first data packet fails to be transmitted to the second node in N continuous transmission opportunities used for sending first data, where N is a minimum data packet transmission quantity of the first data and is an integer greater than 0.

The transceiver unit 1010 may be configured to send the second data packet or stop sending in a next transmission opportunity.

In a possible implementation, the transceiver unit 1010 may further be configured to send configuration signaling to the second node, or receive configuration signaling from the second node. The configuration signaling includes resource information, the resource information includes information indicating one or more transmission opportunities for receiving the first data by the second node, and the configuration signaling further includes at least one of the following: the minimum data packet transmission quantity and a first threshold. The first threshold may be less than or equal to the minimum data packet transmission quantity.

When the apparatus 1000 is configured to perform the method performed by the second node in FIG. 9, the transceiver unit 1010 may be configured to perform step S901 of receiving the control information and the first data packet from the first node; and the processing unit 1020 may be configured to perform step S902, S903, and the like.

The transceiver unit 1010 is configured to receive, in a current transmission opportunity, the control information and the first data packet from the first node. The control information fails to be received, in M continuous transmission opportunities before the current transmission opportunity, from the first node, and M is an integer greater than 0. The M continuous transmission opportunities and the current transmission opportunity are used to receive the first data from the first node, and the first data includes the first data packet.

If M is greater than or equal to the first threshold, the processing unit 1020 determines that the first data packet is a new data packet.

Further, if M is less than the first threshold, the processing unit 1020 determines, based on an SN of the first data packet, whether the first data packet is a retransmission data packet or the new data packet.

Further, if it is determined that the first data packet is the retransmission data packet, the processing unit 1020 combines the first data packet with a previously received data packet, or discards the first data packet.

Further, if it is determined that the first data packet is the new data packet, the processing unit 102 performs check on the first data packet, and delivers the first data packet that is successfully checked as the new data packet, or buffers the first data packet that fails to be checked.

The first threshold may be less than or equal to the minimum data packet transmission quantity of the first data.

Optionally, the transceiver unit 1010 may further be configured to send the configuration signaling to the first node, or receive the configuration signaling from the first node. The configuration signaling includes the resource information, the resource information includes the information indicating one or more transmission opportunities for receiving the first data by the second node, and the configuration signaling further includes at least one of the following: the minimum data packet transmission quantity and the first threshold. The first threshold may be less than or equal to the minimum data packet transmission quantity.

It should be understood that a specific process in which the units perform the foregoing corresponding steps is described in detail in the foregoing method embodiments, and for brevity, details are not described herein.

It should be understood that the transceiver unit may be designed in an integrated manner, that is, include both receiving and sending functions, or may be designed in a separate manner, that is, replaced by a receiving unit having a receiving function and a sending unit having a sending function.

The processing unit in FIG. 10 may be implemented by at least one processor or a processor-related circuit. The transceiver unit may be implemented by using a transceiver or a transceiver-related circuit. A storage unit may be implemented by at least one memory.

Figure 11:
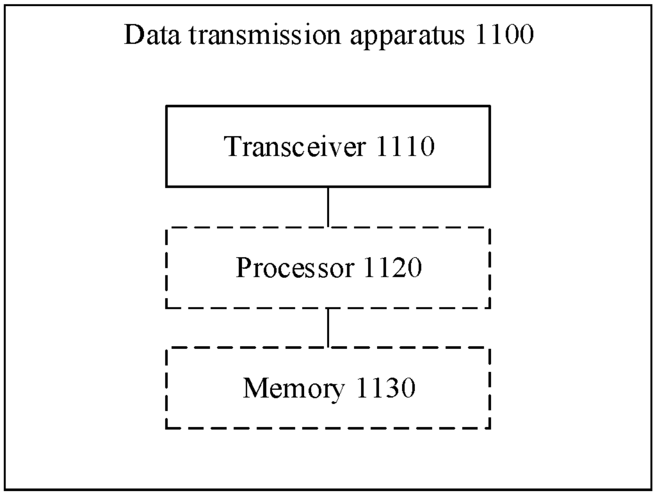
FIG. 11 is a schematic block diagram of a data transmission apparatus according to an embodiment of this application.

As shown in FIG. 11, an embodiment of this application further provides a data transmission apparatus 1100. The apparatus 1100 includes a transceiver 1110, and may further include a processor 1120 coupled to a memory 1130. The transceiver 1130 is configured to receive and/or send a signal. For example, the processor 1120 is configured to control the transceiver 1110 to receive and/or send the signal. The memory 1130 is configured to store a computer program or instructions and/or data, and the processor 1120 is configured to execute the computer program or the instructions and/or the data stored in the memory 1130, so that the methods in the foregoing method embodiments are performed. Specifically, the processor 1120 may be a central processing unit (central processing unit, CPU), a network processor (network processor, NP), or a combination of the CPU and the NP. The processor 1120 may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), generic array logic (generic array logic, GAL), or any combination thereof.

Optionally, the apparatus 1100 includes one or more processors 1120.

Optionally, as shown in FIG. 11, the apparatus 1100 may further include the memory 1130.

Optionally, the apparatus 1100 may include one or more memories 1130.

Optionally, the memory 1130 may be integrated with the processor 1120, or separately disposed.

In a solution, the apparatus 1100 is configured to implement operations performed by the second node in the foregoing method embodiments.

In a solution, the apparatus 1100 is configured to implement operations performed by the first node or the second node in the foregoing method embodiments. An embodiment of this application further provides a data transmission apparatus. The apparatus includes: a memory, configured to store a program; and a processor, configured to execute the program stored in the memory. When the program stored in the memory is executed, the processor is configured to perform the methods performed by the first node or the second node in the foregoing method embodiments.

An embodiment of this application further provides a computer-readable storage medium, including a computer program stored in the computer-readable medium. When the computer program is executed by one or more processors, an apparatus including a processor is enabled to perform the methods performed by the first node or the second node in the foregoing method embodiments.

An embodiment of this application further provides a chip. The chip includes a processor and a data interface. The processor reads, by using the data interface, instructions stored in a memory, to perform the methods performed by the first node or the second node in the foregoing method embodiments.

An embodiment of this application further provides a terminal. The terminal includes any one of the apparatuses in FIG. 10 to FIG. 11. The terminal may be a vehicle, and includes a vehicle having a smart driving technology and an assisted driving technology.

The terms "component", "module", and "system" and the like used in this specification indicate a computer-related entity, hardware, firmware, a combination of hardware and software, software, or software being executed. For example, a component may be but is not limited to a process, a processor, an object, an executable file, an execution thread, a program, and/or a computer running on a processor. As illustrated by using figures, both a computing device and an application that runs on the computing device may be components. One or more components may reside within the process and/or the execution thread, and the component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

In addition, function units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the technical solutions, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, like a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data transmission, comprising:

receiving, in a current transmission opportunity, control information and a first data packet from a first node, wherein the control information comprises a sequence number (SN) of the first data packet, the control information fails to be received, in M continuous transmission opportunities before the current transmission opportunity, from the first node, M is an integer greater than 0, the M continuous transmission opportunities and the current transmission opportunity are used to receive first data from the first node, and the first data comprises the first data packet; and in response to determining that M is greater than or equal to a first threshold that indicates a quantity of times of transmissions of the first data, determining that the first data packet is a new data packet, wherein the first threshold is determined based on a minimum data packet transmission quantity of the first data and a quantity of bits of the SN of the first data packet.

2. The method according to claim 1, wherein the method further comprises:

in response to determining that M is less than the first threshold, determining, based on the SN of the first data packet, whether the first data packet is a retransmission data packet or the new data packet.

3. The method according to claim 1, wherein the method further comprises:

in response to determining that the first data packet is a retransmission data packet, combining the first data packet with a previously received data packet, or discarding the first data packet.

4. The method according to claim 1, wherein the method further comprises:

in response to determining that the first data packet is the new data packet, performing check on the first data packet, and delivering the first data packet that is successfully checked as the new data packet, or buffering the first data packet that fails to be checked.

5. The method according to claim 1, wherein the method further comprises:

sending configuration signaling to the first node, wherein the configuration signaling comprises resource information, the resource information comprises information indicating one or more transmission opportunities for receiving the first data, and the configuration signaling further comprises at least one of the following: a minimum data packet transmission quantity of the first data or the first threshold.

6. The method according to claim 1, wherein the method further comprises:

receiving configuration signaling from the first node, wherein the configuration signaling comprises resource information, the resource information comprises information indicating one or more transmission opportunities for receiving the first data, and the configuration signaling further comprises at least one of the following: a minimum data packet transmission quantity of the first node or the first threshold.

7. The method according to claim 5, wherein the minimum data packet transmission quantity of the first data is determined based on one or more of a service type, a delay requirement, and a cycle feature of the first data.

8. The method according to claim 1, wherein the control information further includes a next expected sequence number (NESN), wherein the NESN indicates an SN of a data packet that the first node expects to receive after the first data packet is received.

9. The method according to claim 1, wherein the first threshold corresponds to a maximum interval at which data packets of the first data are combined during retransmission.

10. A method for data transmission, wherein the method comprises:

determining that a first data packet fails to be transmitted to a second node in N continuous transmission opportunities used for sending first data, wherein N is a minimum data packet transmission quantity that indicates a quantity of times of transmissions of the first data and is an integer greater than 0; and sending a second data packet or stopping sending in a next transmission opportunity, wherein the first data comprises the first data packet, or the first data comprises the first data packet and the second data packet, wherein the method further comprises:

sending configuration signaling to the second node, wherein the configuration signaling comprises resource information, the resource information comprises information indicating one or more transmission opportunities for receiving the first data by the second node, and the configuration signaling further comprises the minimum data packet transmission quantity and a first threshold that is determined based on the minimum data packet transmission quantity.

11. The method according to claim 10, wherein the first threshold is less than or equal to the minimum data packet transmission quantity.

12. A device for data transmission, comprising at least one processor and at least one memory coupled to the at least one processor, wherein the at least one memory stores programming instructions for execution by the at least one processor to cause the device to perform operations comprising:

receiving, in a current transmission opportunity, control information and a first data packet from a first node, wherein the control information comprises a sequence number (SN) of the first data packet, the control information fails to be received, in M continuous transmission opportunities before the current transmission opportunity, from the first node, M is an integer greater than 0, the M continuous transmission opportunities and the current transmission opportunity are used to receive first data from the first node, and the first data comprises the first data packet; and in response to determining that M is greater than or equal to a first threshold that indicates a quantity of times of transmissions of the first data, determining that the first data packet is a new data packet, wherein the first threshold is determined based on a minimum data packet transmission quantity of the first data and a quantity of bits of the SN of the first data packet.

13. The device according to claim 12, wherein the operations further comprise:

in response to determining that M is less than the first threshold, determining, based on the SN of the first data packet, whether the first data packet is a retransmission data packet or the new data packet.

14. The device according to claim 12, wherein the operations further comprise:

in response to determining that the first data packet is a retransmission data packet, combining the first data packet with a previously received data packet, or discarding the first data packet.

15. The device according to claim 12, wherein the operations further comprise:

in response to determining that the first data packet is the new data packet, performing check on the first data packet, and delivering the first data packet that is successfully checked as the new data packet, or buffering the first data packet that fails to be checked.

16. The device according to claim 12, wherein the operations further comprise:

sending configuration signaling to the first node, wherein the configuration signaling comprises resource information, the resource information comprises information indicating one or more transmission opportunities for receiving the first data, and the configuration signaling further comprises at least one of the following: a minimum data packet transmission quantity of the first data or the first threshold.

17. The device according to claim 12, wherein the operations further comprise:

receiving configuration signaling from the first node, wherein the configuration signaling comprises resource information, the resource information comprises information indicating one or more transmission opportunities for receiving the first data, and the configuration signaling further comprises at least one of the following: a minimum data packet transmission quantity of the first node or the first threshold.

18. The device according to claim 16, wherein the minimum data packet transmission quantity of the first data is determined based on one or more of a service type, a delay requirement, and a cycle feature of the first data.

19. The device according to claim 12, wherein the control information further includes a next expected sequence number (NESN), wherein the NESN indicates an SN of a data packet that the first node expects to receive after the first data packet is received.

20. The device according to claim 12, wherein the first threshold corresponds to a maximum interval at which data packets of the first data are combined during retransmission.

* * * * *